(12) United States Patent
Yamada

(10) Patent No.: US 11,270,453 B2
(45) Date of Patent: Mar. 8, 2022

(54) REGION DETECTION DEVICE

(71) Applicant: FUNAI ELECTRIC CO., LTD., Osaka (JP)

(72) Inventor: Daisuke Yamada, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/047,954

(22) PCT Filed: May 9, 2019

(86) PCT No.: PCT/JP2019/018647
§ 371 (c)(1),
(2) Date: Oct. 15, 2020

(87) PCT Pub. No.: WO2020/110347
PCT Pub. Date: Jun. 4, 2020

(65) Prior Publication Data
US 2021/0158559 A1     May 27, 2021

Related U.S. Application Data

(60) Provisional application No. 62/773,512, filed on Nov. 30, 2018.

(51) Int. Cl.
*G06T 7/62*     (2017.01)
*G06T 7/64*     (2017.01)

(52) U.S. Cl.
CPC .............. *G06T 7/62* (2017.01); *G06T 7/64* (2017.01); *G06T 2207/20048* (2013.01)

(58) Field of Classification Search
CPC ... G06T 7/62; G06T 7/64; G06T 2207/20048; G06T 7/73
USPC .......................................... 382/190
See application file for complete search history.

(56) References Cited

U.S. PATENT DOCUMENTS

| | | | |
|---|---|---|---|
| 2014/0003665 A1 | 1/2014 | Hoshino | |
| 2015/0007841 A1 | 1/2015 | Yamasaki | |

FOREIGN PATENT DOCUMENTS

| | | | |
|---|---|---|---|
| JP | 8-194825 | | 7/1996 |
| JP | 08194825 A | * | 7/1996 |
| JP | 2012-146182 | | 8/2012 |
| JP | 2012146182 A | * | 8/2012 |
| JP | 2015-13002 | | 1/2015 |
| JP | 2018-55364 | | 4/2018 |
| WO | 2012/124686 | | 9/2012 |

OTHER PUBLICATIONS

International Search Report (ISR) dated Aug. 6, 2019 in International (PCT) Application No. PCT/JP2019/018647.

* cited by examiner

*Primary Examiner* — Amandeep Saini
(74) *Attorney, Agent, or Firm* — Wenderoth, Lind & Ponack, L.L.P.

(57) ABSTRACT

Region detection device includes acquirer that acquires a fingertip image of a fingertip including a nail, converter that transforms the fingertip image into a polar coordinate image in which one point inside the nail in the fingertip image is used as a pole, and detector that detects a region of the nail using the polar coordinate image.

10 Claims, 14 Drawing Sheets

REGION DETECTION DEVICE

TECHNICAL FIELD

The present invention relates to a region detection device.

BACKGROUND ART

A region detection device has conventionally been known in which a region to be detected is marked in advance with a color easily distinguishable from colors of the other regions and is detected by this color.

CITATION LIST

Patent Literature

[PTL 1]
 Japanese Unexamined Patent Application Publication No. 2012-146182
[PTL 2]
 WO/2012/124686
[PTL 3]
 Japanese Unexamined Patent Application Publication No. 2018-55364
[PTL 4]
 Japanese Unexamined Patent Application Publication No. 2015-13002

SUMMARY OF INVENTION

Technical Problem

However, detecting a region of a nail by color is difficult in cases such as when there are no markings on the nail or when a base coat serving also as a marking is transparent.

In view of this, it is an object of the present invention to provide a region detection device capable of detecting a region of a nail.

Solution to Problem

In order to achieve the above-described object, a region detection device according to one aspect of the present invention includes an acquirer that acquires a fingertip image of a fingertip including a nail, a converter that transforms the fingertip image into a polar coordinate image in which one point inside the nail in the fingertip image is used as a pole, and a detector that detects a region of the nail using the polar coordinate image.

The contour of the nail has a closed structure. Thus, in the polar coordinate image with one point inside the nail as its pole, the contour of the nail appears as a line segment extending in an angular direction. Accordingly, by using the polar coordinate image using one point inside the nail as a pole, it is possible to detect the region of the nail relatively simply and relatively accurately.

In this way, the region detection device with the above-described configuration is capable of detecting the region of a nail.

For example, the detector may extract a plurality of contour candidate pixels that are candidates for pixels located at a contour of the nail from among pixels in the polar coordinate image, extract one or more contour candidate line segments, each consisting of a group of contour candidate pixels adjacent in a pixel sequence in a direction other than a direction of a distance in the polar coordinate image, from among the plurality of contour candidate pixels, and detect the region of the nail in accordance with the one or more contour candidate line segments that have been extracted.

This improves the accuracy in detecting the region of a nail.

For example, when a plurality of contour candidate line segments have been extracted in the extraction of the one or more contour candidate line segments, the detector may select at least one contour candidate line segments that do not overlap in the direction of the distance in the polar coordinate image from among the plurality of contour candidate line segments that have been extracted, and detect the region of the nail in accordance with the one or more contour candidate line segments that have been selected.

This improves the accuracy in detecting the region of a nail.

For example, in a case where the plurality of contour candidate line segments that have been extracted include a plurality of contour candidate line segments targeted for an alternative selection in the selection of the at least one contour candidate line segments, the detector may make the alternative selection by performing weighing on each of the plurality of contour candidate line segments targeted for the alternative selection so that a longer contour candidate line segment is higher weighed.

This improves the accuracy in detecting the region of a nail.

For example, in a case where the plurality of contour candidate line segments that have been extracted include a plurality of contour candidate line segments targeted for an alternative selection in the selection of the at least one contour candidate line segments, the detector may make the alternative selection by performing weighing on each of the plurality of contour candidate line segments targeted for the alternative selection so that a contour candidate line segment that has a shorter distance from the pole is higher weighed.

This improves the accuracy in detecting the region of a nail.

For example, in a case where a plurality of contour candidate line segments have been selected in the selection of the at least one contour candidate line segments, the detector may combine the plurality of contour candidate line segments that have been selected, to calculate a combined contour line segment, and detect the region of the nail in accordance with the combined contour line segment that has been calculated.

This improves the accuracy in detecting the region of a nail.

For example, the detector may perform inverse transform of the transform on the combined contour line segment, and extract the region of the nail in accordance with the combined contour line segment that has undergone the inverse transform.

This improves the accuracy in detecting the region of a nail.

For example, in a case where the combined contour line segment that has undergone the inverse transform has a recess, the detector may perform convex full processing on the combined contour line segment to calculate the contour of the nail, and detect the region of the nail in accordance with the contour of the nail that has been calculated.

This improves the accuracy in detecting the region of a nail.

For example, the region detection device may further include an identifier that identifies the one point from the fingertip image.

This allows identification of the one point.

For example, the identifier may extract a contour of the fingertip from the fingertip image, calculate a rectangle circumscribing the contour of the fingertip that has been extracted, and identify a center of the rectangle that has been calculated, as the one point.

This improves the accuracy in identifying the one point.

For example, the region detection device may further include an image capturing unit that captures an image. The acquirer may acquire the image captured by the image capturing unit as the fingertip image.

Accordingly, the region detection device is capable of capturing the fingertip image by itself.

Advantageous Effects of Invention

The present invention provides a region detection device capable of detecting a region of a nail.

DESCRIPTION OF EMBODIMENTS

Embodiments of the present invention will be described in detail hereinafter with reference to the drawings. Note that each embodiment described below illustrates one generic or specific example of the present invention. Numerical values, shapes, materials, constituent elements, positions in the arrangement of the constituent elements and forms of connection of the constituent elements, steps, sequence of steps, and so on in the following embodiments are mere examples and do not intend to limit the scope of the present invention. Among the constituent elements described in the following embodiments, those that are not recited in any independent claim, which represents the broadest concept, are described as optional constituent elements.

Embodiment 1

A region detection device according to Embodiment 1 will be described hereinafter. This region detection device is a device for detecting a region of a nail from a fingertip image of a fingertip including the nail. The fingertip image as used herein refers to an image captured by looking down the fingertip from above the front of the nail surface.

Configuration

Figure 1:
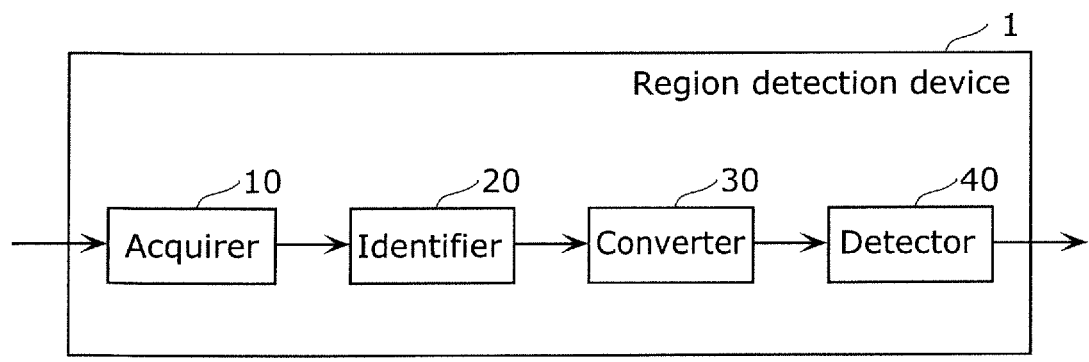
FIG. 1 is a block diagram illustrating a configuration of a region detection device according to Embodiment 1.

FIG. 1 is a block diagram illustrating a configuration of region detection device 1 according to Embodiment 1.

As illustrated in FIG. 1, region detection device 1 includes acquirer 10, identifier 20, converter 30, and detector 40.

For example, region detection device 1 may be implemented as a computer including a processor and a memory. In this case, each constituent element of region detection device 1 is implemented by the processor executing a program stored in the memory.

Alternatively, for example, region detection device 1 may be implemented as a logic circuit, or may be implemented as a combination of a logic circuit and a computer.

Acquirer 10 acquires a fingertip image of a fingertip including a nail. For example, acquirer 10 may include a communication interface that enables wired or wireless communication with an external image capturing device and may acquire a fingertip image from the image capturing device that is communicably connected to the acquirer. Alternatively, for example, acquirer 10 may include a universal serial bus (USB) port and acquire a fingertip image from a USB memory connected to the USB port.

Figure 2:
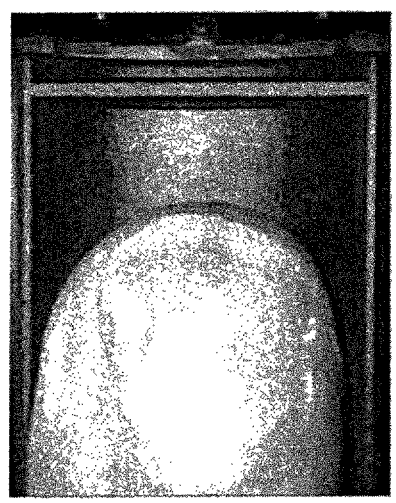
FIG. 2 shows one example of a fingertip image according to Embodiment 1.

FIG. 2 shows one example of a fingertip image acquired by acquirer 10.

Identifier 20 identifies one point inside the nail from the fingertip image acquired by acquirer 10. The position of the one point is not particularly limited provided that it is a point inside the nail, but the point is preferably located in the vicinity of the center of the nail. For example, identifier 20 may extract the contour of the fingertip from the fingertip image, calculate a rectangle circumscribing the extracted contour of the fingertip, and identify the center of the calculated rectangle as one point.

Converter 30 transforms the fingertip image acquired by acquirer 10 into a polar coordinate image in which the one point identified by identifier 20 is used as a pole. The polar coordinate image as used herein refers to an image obtained by transforming the fingertip image such that the position of each pixel configuring the fingertip image is placed at a position in a plane whose longitudinal axis indicates the distance (radius vector) from the pole defined in the polar coordinate system centered on the pole and whose lateral axis indicates the angle (amplitude) centered on the pole (hereinafter, this processing for transformation is also referred to as "coordinate transformation processing").

Hereinafter, one specific example of the transformation into the polar coordinate image performed by converter 30 will be described with reference to FIGS. 3 to 7.

First, converter 30 performs contour enhancement processing for enhancing the contour on the fingertip image and processes the fingertip image into a first contour weighted image.

Figure 3:
FIG. 3 shows one example of a first contour weighted image according to Embodiment 1.

FIG. 3 shows one example of the first contour weighted image processed by converter 30.

Next, converter 30 extracts the contour of the fingertip from the fingertip image and generates a mask image for masking a region other than the fingertip on the basis of the extracted contour of the fingertip.

Figure 4:
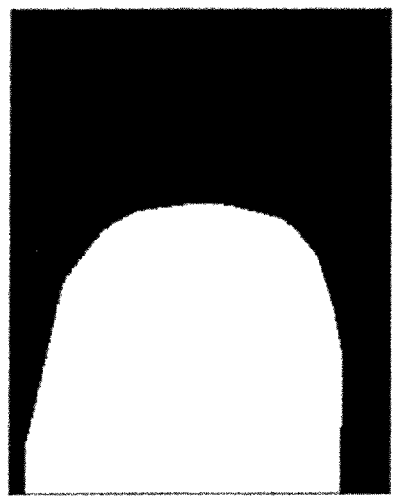
FIG. 4 shows one example of a mask image according to Embodiment 1.

FIG. 4 shows one example of the mask image generated by converter 30.

Next, converter 30 performs masking processing for masking a region other than the fingertip, using the mask image so as to process the first contour weighted image into a second contour weighted image in which the region other than the fingertip is masked.

Figure 5:
FIG. 5 shows one example of a second contour weighted image according to Embodiment 1.

FIG. 5 shows one example of the second contour weighted image processed by converter 30.

Next, converter 30 performs coordinate transformation processing on the second contour weighted image so as to transform the second contour weighted image into a polar coordinate image.

Figure 6:
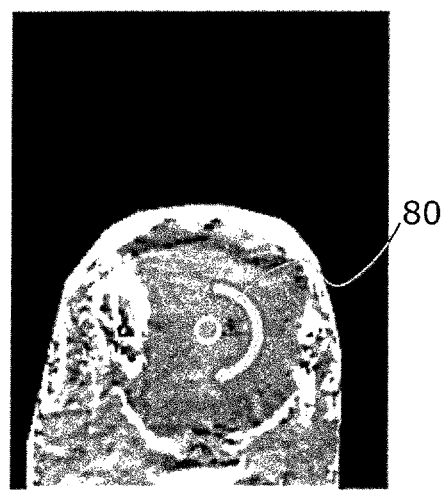
FIG. 6 is a schematic diagram showing one example of coordinate transformation processing performed by a converter according to Embodiment 1.

FIG. 6 is a schematic diagram showing one example of the coordinate transformation processing performed on the second contour weighted image by converter 30.

As illustrated in FIG. 6, converter 30 uses one point 80 in the second contour weighted image as a pole and scans the distance (radius vector) of each pixel from the pole and the angle (amplitude) of each pixel centered on the pole in a clockwise direction using the pole as the center and a 12 o'clock position as a starting point (the scanning direction may be a counterclockwise direction). Then, converter 30 performs coordinate transformation processing using the distance of each pixel from the pole and the angle of each pixel centered on the pole, both obtained by scanning, so as to transform the second contour weighted image into a polar coordinate image.

Figure 7:
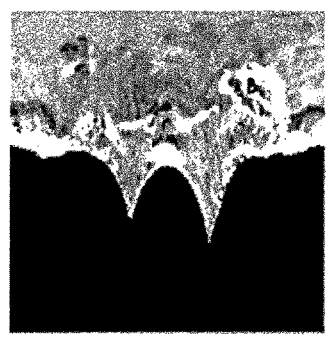
FIG. 7 shows one example of a polar coordinate image according to Embodiment 1.

FIG. 7 shows one example of the polar coordinate image transformed by converter 30. The polar coordinate image illustrated in FIG. 7 is an image in which pixels starting from an amplitude of zero degrees to an amplitude of 360 degrees are arranged from the left to the right, and pixels starting from a radius vector of zero to a larger radius vector are arranged from the top to the bottom.

Referring back to FIG. 1, region detection device 1 continues to be described.

Detector 40 detects a region of the nail, using the polar coordinate image transformed by converter 30.

Hereinafter, one specific example in which detector 40 detects a region of the nail will be described with reference to FIGS. 8 to 15.

First, detector 40 extracts a plurality of contour candidate pixels as candidates for pixels located along the contour of the nail from among the pixels in the polar coordinate image.

Figure 8:
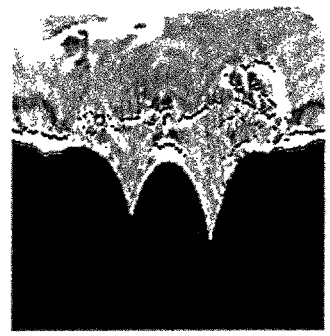
FIG. 8 is a schematic diagram showing one example in which a detector according to Embodiment 1 extracts a plurality of contour candidate pixels.

FIG. 8 is a schematic diagram showing one example in which detector 40 extracts a plurality of contour candidate pixels. Each black point in FIG. 8 indicates each of the contour candidate pixels.

As illustrated in FIG. 8, as one example, detector 40 extracts, as each of the contour candidate pixels, each pixel that is located in a contour portion enhanced by the contour enhancement processing from among the pixels in the polar coordinate image.

Next, detector 40 extracts one or more contour candidate line segments, each consisting of a group of contour candidate pixels adjacent in a pixel sequence in a direction other than the direction of the distance in the polar coordinate image (i.e., the up-down direction in the contour candidate image illustrated in FIG. 8), from among the extracted contour candidate pixels. Here, the reason why a group of contour candidate pixels adjacent in a pixel sequence in the direction of the distance in the polar coordinate image is excluded from contour candidate line segments to be extracted is because, since the pole is located inside the contour of the nail, the contour of the nail will not appear as a line segment that forms a line in the direction of the distance in the polar coordinate image.

Figure 9:
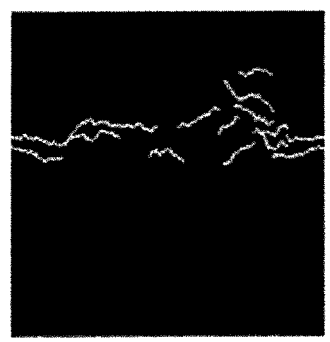
FIG. 9 shows one example of extracted one or more contour candidate line segments according to Embodiment 1.

FIG. 9 shows one example of the one or more contour candidate line segments extracted by detector 40.

In the case where a plurality of contour candidate line segments have been extracted in the extraction of the one or more contour candidate line segments, detector 40 selects one or more contour candidate line segments that do not overlap one another in the direction of the distance in the polar coordinate image.

Figure 10:
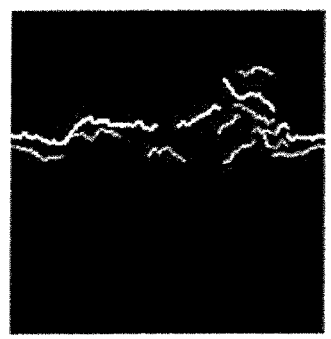
FIG. 10 shows one example of selected one or more contour candidate line segments according to Embodiment 1.

FIG. 10 shows one example of the one or more contour candidate line segments selected by detector 40. In FIG. 10, each enhanced line segment indicates each of the one or more selected contour candidate line segments.

In the case where there are a plurality of contour candidate line segments that are to be subjected to an alternative selection in the selection of the one or more contour candidate line segments, detector 40 makes the above alternative selection by weighing each of the contour candidate line segments that are to be subjected to the alternative selection. This weighing is preferably conducted such that a contour candidate line segment that is estimated as being more likely to be a line segment corresponding to the contour of the nail is higher weighted.

For example, detector 40 may conduct weighing such that a longer contour candidate line segment is higher weighted. Alternatively, for example, detector 40 may conduct weighing such that a contour candidate line segment that has a shorter distance from the pole is higher weighted.

In the case where a plurality of contour candidate line segments have been selected in the selection of the one or more contour candidate line segments, detector 40 combines the selected contour candidate line segments to calculate a combined contour. In the case of combining a first contour candidate line segment and a second contour candidate line segment, detector 40 combine the first and second contour candidate line segments by interpolating a straight line between a line-segment end of the first contour candidate line segment that is closer to the second contour candidate line segment, out of the two line-segment ends of the first contour candidate line segment, and a line-segment end of the second contour candidate line segment that is closer to the first contour candidate line segment, out of the two line-segment ends of the second contour candidate line segment.

Figure 11:
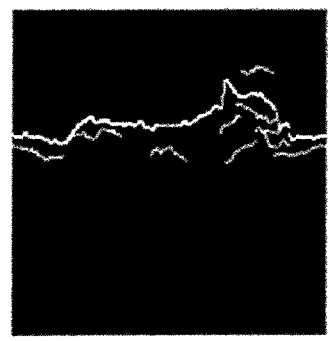
FIG. 11 shows one example of a combined contour according to Embodiment 1.

FIG. 11 shows one example of the combined contour combined by detector 40. In FIG. 11, one enhanced line that extends from the left side to the right side in the drawing indicates the combined contour.

In the case where only one contour candidate line segment has been selected in the selection of the one or more contour candidate line segments, detector 40 calculates the selected one contour candidate line segment as the combined contour.

Next, detector 40 performs inverse transform of the transform in the coordinate transformation processing on the calculated combined contour so as to calculate an inverse transform line.

Figure 12:
FIG. 12 shows one example of an inverse transform line according to Embodiment 1.

FIG. 12 shows one example of the inverse transform line calculated by detector 40. In FIG. 12, the inverse transform line is illustrated overlaid on the second contour weighted image (see FIG. 5) that is before execution of the coordinate transformation processing. In FIG. 12, a closed curve consisting of a group of points indicates the inverse transform line.

Detector 40 performs convex hull processing on the inverse transform line so as to calculate the contour of the nail. The reason for performing convex hull processing on the inverse transform line is because, in general, the nail has a convex shape and is not contoured in a concave shape, so that a recess in the inverse transform line is estimated as not being the contour of the nail, but being caused by, for example, a luster on the nail given as a result of light reflection on the nail.

Figure 13:
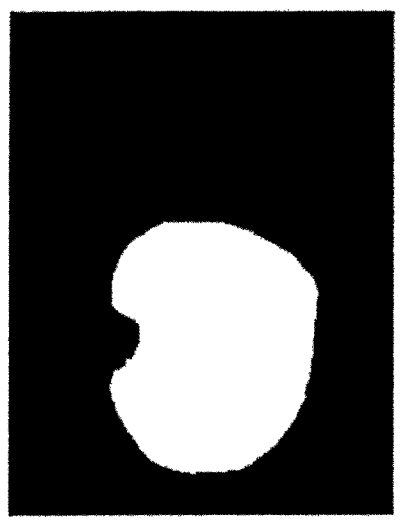
FIG. 13 is a schematic diagram showing one example of a region surrounded by an inverse transform line that has a recess.

FIG. 13 is a schematic diagram showing one example of a region surrounded by the inverse transform line that has a recess.

Figure 14:
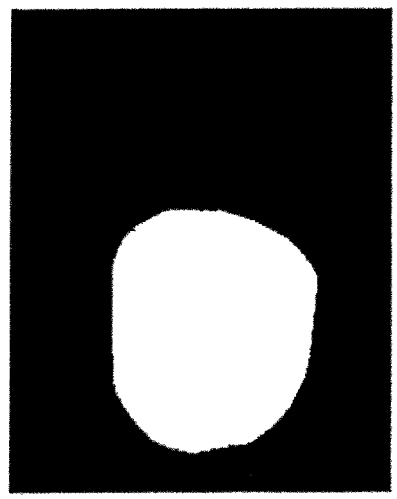
FIG. 14 is a schematic diagram showing one example of a region surrounded by an inverse transform line that has undergone convex hull processing.

FIG. 14 is a schematic diagram showing one example of a region surrounded by the inverse transform line that has undergone the convex hull processing.

Figure 15:
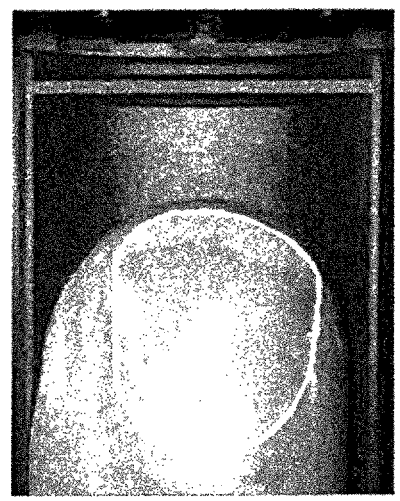
FIG. 15 shows one example of the contour of a nail according to Embodiment 1.

FIG. 15 shows one example of the contour of the nail calculated by detector 40. In FIG. 15, the contour of the nail is illustrated overlaid on the fingertip image (see FIG. 2) acquired by acquirer 10.

After having calculated the contour of the nail, detector 40 detects the region surrounded by the contour of the nail as the region of the nail. Then, detector 40 outputs a signal for identifying the detected region of the nail.

Operations

Hereinafter, operations performed by region detection device 1 with the above-described configuration will be described with reference to the drawings.

Region detection device 1 performs first nail region detection processing for acquiring a fingertip image of a fingertip including a nail and detecting a region of the nail from the acquired fingertip image.

Figure 16:
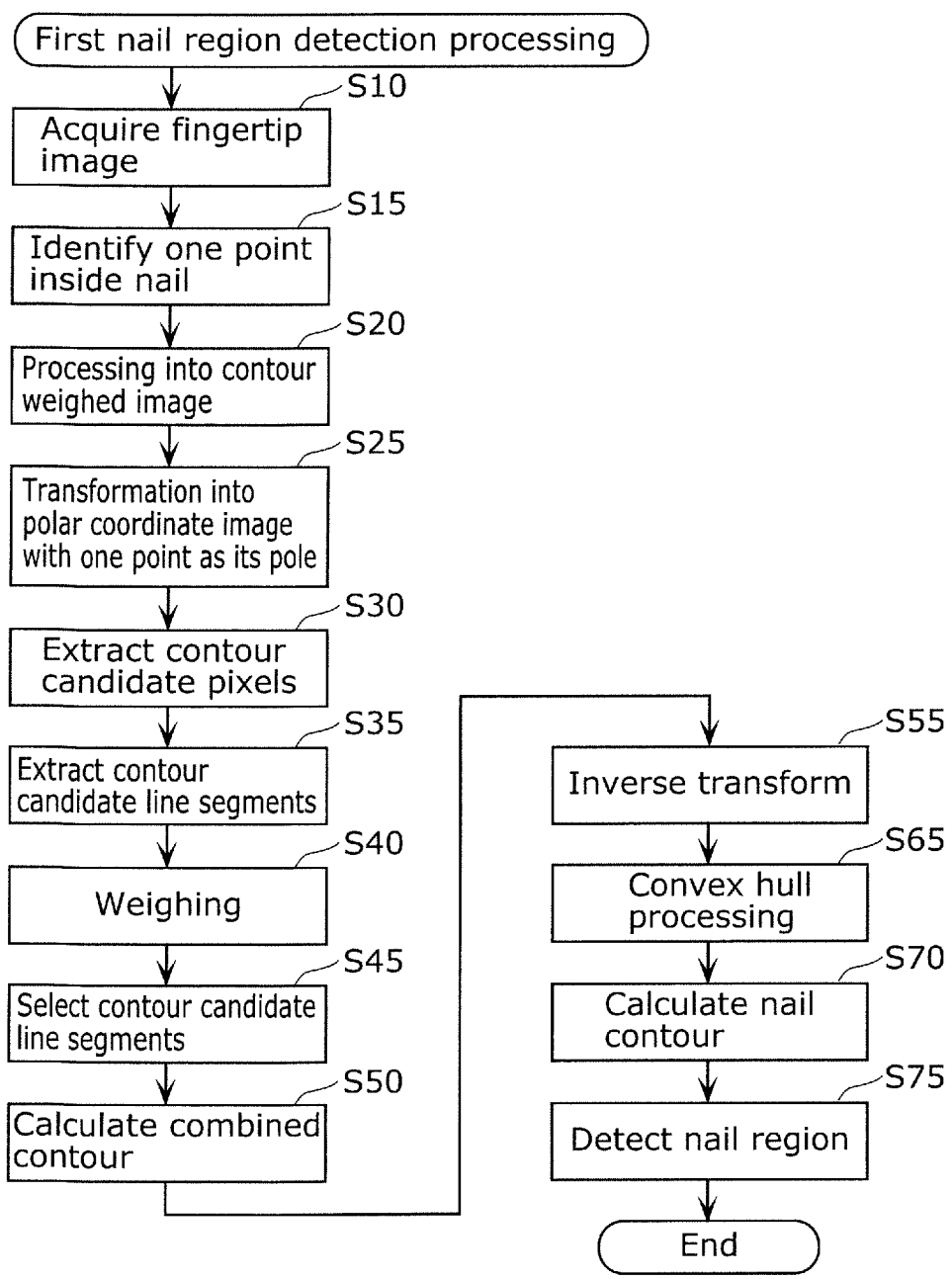
FIG. 16 is a flowchart of first nail region detection processing according to Embodiment 1.

FIG. 16 is a flowchart of the first nail region detection processing.

The first nail region detection processing is started, for example, when an operation to start the first nail region detection processing is performed on region detection device 1.

When the first nail region detection processing is started, acquirer 10 acquires a fingertip image of a fingertip including a nail (step S10).

When the fingertip image has been acquired, identifier 20 identifies one point inside the nail (step S15). At this time, identifier 20 extracts the contour of the fingertip from the fingertip image, calculates a rectangle circumscribing the extracted contour of the fingertip, and identifies the center of the calculated rectangle as one point. Meanwhile, converter 30 performs contour enhancement processing and masking processing on the fingertip image so as to process the fingertip image into a second contour weighted image (step S20).

Next, converter 30 performs coordinate transformation processing using the identified one point as a pole on the second contour weighted image so as to transform the second contour weighted image into a polar coordinate image (step S25).

When the polar coordinate image has been obtained by transformation, detector 40 extracts a plurality of contour candidate pixels from the polar coordinate image (step S30). Then, detector 40 extracts, from among the extracted contour candidate pixels, one or more contour candidate line segments, each consisting of a group of contour candidate pixels adjacent in a pixel sequence in a direction other than the direction of the distance in the polar coordinate image (step S35).

When one or more contour candidate line segments have been extracted, detector 40 performs weighing on each contour candidate line segment (step S40), selects one or more contour candidate line segments that do not overlap in the direction of the distance in the polar coordinate image (step S45), and combines the selected contour candidate line segments to calculate a combined contour (step S50).

When the combined contour has been calculated, detector 40 performs inverse transform of the transform in the coordinate transformation processing on the calculated combined contour so as to calculate an inverse transform line (step S55).

When the inverse transform line has been calculated, detector 40 performs convex hull processing on the inverse transform line (step S65) and calculates the contour of the nail (step S70).

When the contour of the nail has been calculated, detector 40 detects a region surrounded by the contour of the nail as the region of the nail (step S75).

When the processing in step S75 has ended, region detection device 1 ends the first nail region detection processing.

Consideration

As described above, region detection device 1 with the above-described configuration performs the above-described first nail region detection processing so as to transform the fingertip image into the polar coordinate image with one point inside the nail as its pole and detects the region of the nail using the polar coordinate image obtained by the transformation. In general, the contour of a nail has a closed structure, so that in the polar coordinate image with one point inside the nail as its pole, the contour of the nail appears as a line segment extending in an angular direction. Thus, region detection device 1 can detect the region of the nail relatively simply and relatively accurately.

Embodiment 2

Hereinafter, a description is given of a region detection device according to Embodiment 2 whose configuration differs in part from the configuration of region detection device 1 according to Embodiment 1.

Configuration

Figure 17:
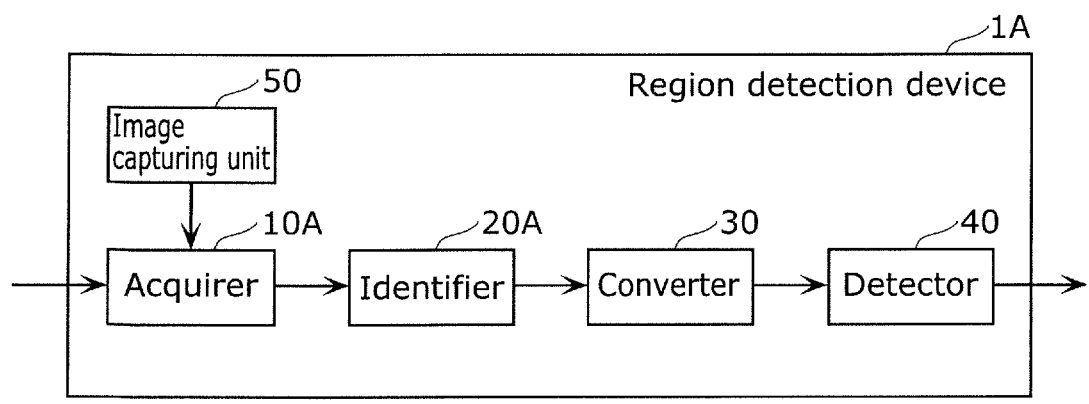
FIG. 17 is a block diagram illustrating a configuration of a region detection device according to Embodiment 2.

FIG. 17 is a block diagram illustrating a configuration of region detection device 1A according to Embodiment 2. Hereinafter, constituent elements of region detection device 1A that are similar to those of region detection device 1 are regarded as having already been described and are given the same reference signs, and a detailed description thereof will be omitted. The following description focuses on differences from region detection device 1.

As illustrated in FIG. 17, region detection device 1A differs from region detection device 1 according to Embodiment 1 in that acquirer 10 is replaced by acquirer 10A, identifier 20 is replaced by identifier 20A, and image capturing unit 50 is additionally provided.

Image capturing unit 50 captures an image. More specifically, image capturing unit 50 captures an image of a fingertip including a nail.

Figure 18:
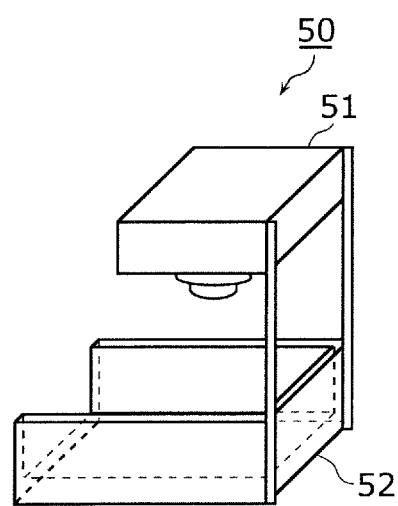
FIG. 18 is a perspective view of an image capturing unit according to Embodiment 2.

FIG. 18 is a perspective view of image capturing unit 50.

As illustrated in FIG. 18, image capturing unit 50 includes image capturing device 51 and fingertip placement base 52.

Fingertip placement base 52 is a base on which a fingertip to be captured is placed. When a fingertip is placed thereon, fingertip placement base 52 holds the fingertip such that the fingertip fits in a predetermined position within the angle of view of image capturing device 51. As long as it is possible to hold a fingertip to be captured such that the fingertip fits in a predetermined position within the angle of view of image capturing device 51, fingertip placement base 52 may have a structure that includes a side wall that surrounds the fingertip placed thereon on the tip end side and on the right and left sides, for example as illustrated in FIG. 18, or may have any other structure.

Image capturing device 51 includes, for example, an image sensor and an optical system, and captures an image of a fingertip placed on fingertip placement base 52. Image capturing device 51 is fixed to fingertip placement base 52 such that the fingertip placed on fingertip placement base 52 fits in a predetermined position within the angle of view. More specifically, image capturing device 51 is fixed to fingertip placement base 52 such that the central point of an image to be captured is located inside a nail of a fingertip to be captured. Accordingly, the fingertip image captured by image capturing device 51 is an image whose central point is located inside the nail of the fingertip to be captured.

Acquirer 10A acquires the image captured by image capturing unit 50 as a fingertip image of a fingertip including a nail.

Identifier 20A identifies one point inside the nail from fingertip image acquired by acquirer 10A. More specifically, identifier 20A identifies the central point of the fingertip image as one point.

Operations

Hereafter, operations performed by region detection device 1A with the above-described configuration will be described with reference to the drawings.

Region detection device 1A performs second nail region detection processing that differs in part from the first nail region detection processing according to Embodiment 1.

Figure 19:
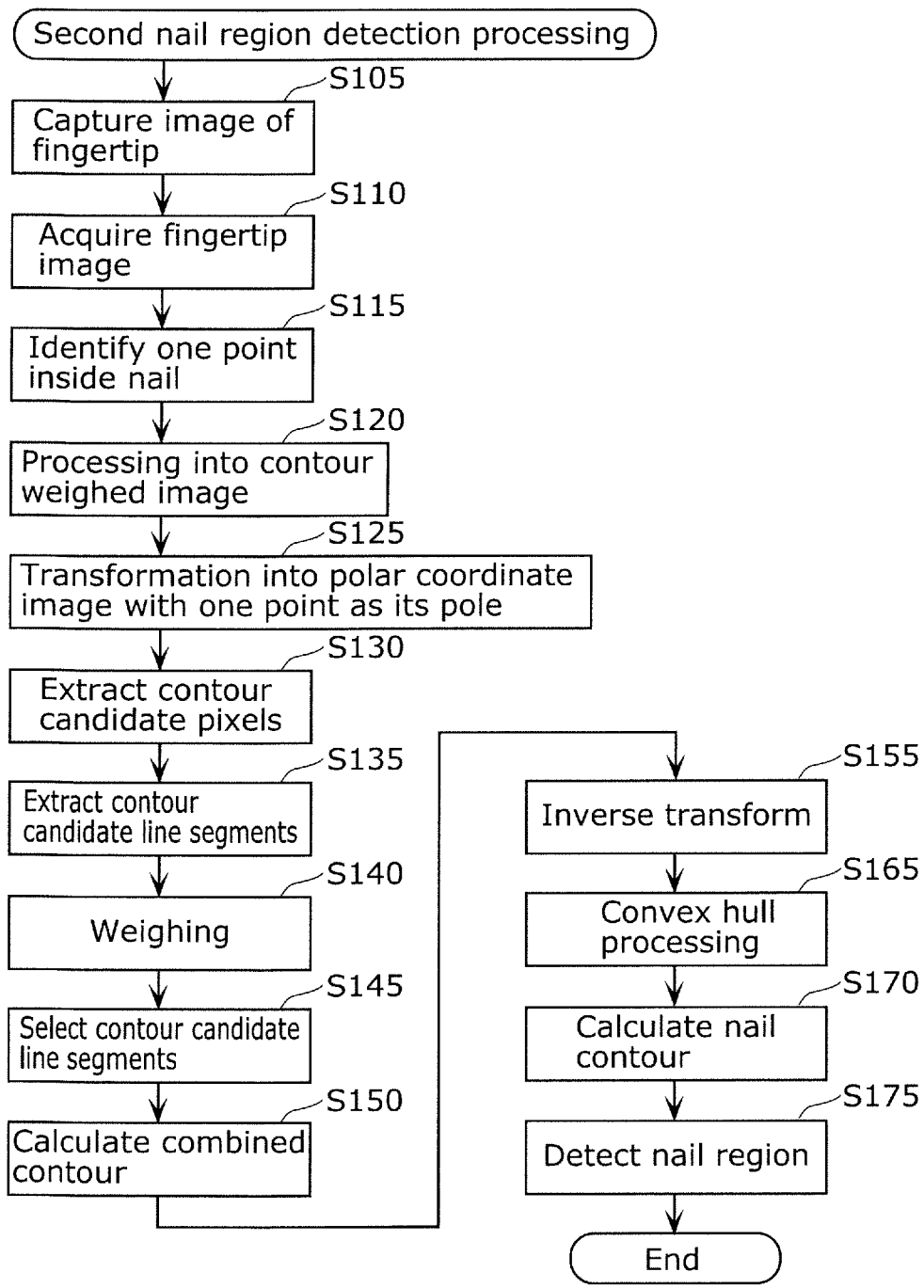
FIG. 19 is a flowchart of second nail region detection processing according to Embodiment 2.

FIG. 19 is a flowchart of the second nail region detection processing.

In the second nail region detection processing, processing from step S120 to step S175 is similar to the processing from step S20 to step S75 in the first nail region detection processing according to Embodiment 1. Thus, hereinafter, the processing from step S120 to step S175 is regarded as having already been described, and a detailed description thereof will be omitted. The following description focuses on processing from step S105 to step S115.

The second nail region detection processing is started, for example, when an operation to start the second nail region detection processing is performed on region detection device 1A under the condition in which a fingertip is placed on fingertip placement base 52.

When the second nail region detection processing is started, image capturing unit 50 uses the fingertip placed on fingertip placement base 52 as a target for image capture and captures an image of the fingertip including a nail (step S105).

When the image of the fingertip including the nail has been captured, acquirer 10A acquires this image as a fingertip image from image capturing unit 50 (step S110).

When the fingertip image has been acquired, identifier 20A identifies one point inside the nail (step S115). At this time, identifier 20A identifies the central point of the fingertip image as one point.

When the processing in step S115 has ended, region detection device 1A proceeds to processing in step S120. Then, when the processing in step S175 has ended, region detection device 1A ends the second nail region detection processing.

Consideration

As described above, like region detection device 1 according to Embodiment 1, region detection device 1A with the above-described configuration can detect the region of the nail relatively simply and relatively accurately.

Embodiment 3

Hereinafter, a description is given of a region detection device according to Embodiment 3 whose configuration differs in part from the configuration of region detection device 1 according to Embodiment 1.

Configuration

Figure 20:
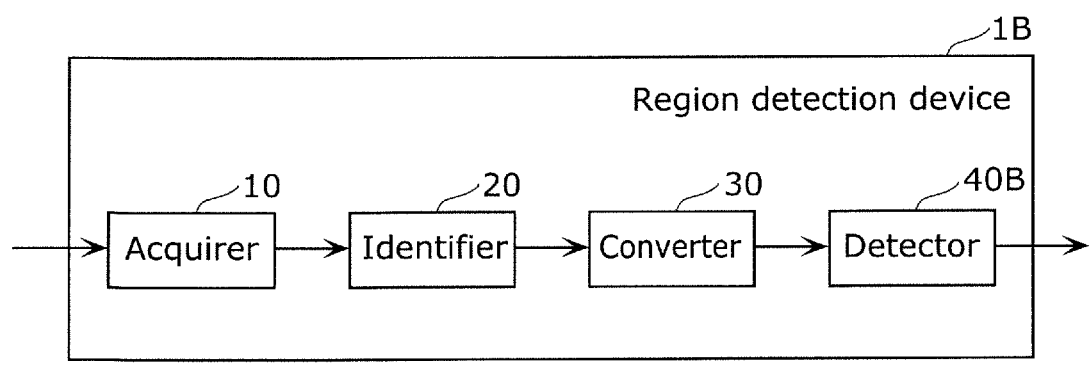
FIG. 20 is a block diagram illustrating a configuration of a region detection device according to Embodiment 3.

FIG. 20 is a block diagram illustrating a configuration of region detection device 1B according to Embodiment 3. Hereinafter, constituent elements of region detection device 1B that are similar to those of region detection device 1 are regarded as having already been described and are given the same reference signs, and a detailed description thereof will be omitted. The following description focuses on differences from region detection device 1.

As illustrated in FIG. 20, region detection device 1B differs from region detection device 1 according to Embodiment 1 in that detector 40 is replaced by detector 40B.

Detector 40B is configured by changing a selection method used to make an alternative selection of contour candidate line segments from the method used in detector 40 according to Embodiment 1. Detector 40B makes an alternative selection of contour candidate line segments with use of the fact that the contour of the nail in the fingertip image is, in general, approximately symmetric with respect to the longitudinal center line of the nail serving as a symmetry axis. More specifically, in the alternative selection of contour candidate line segments, detector 40B selects, from among a plurality of contour candidate line segments to be selected, a contour candidate line segment that is most similar to a contour candidate line segment that is located at the location of the line symmetry with respect to the longitudinal center line of the nail in the fingertip image serving as a symmetry axis.

Operations

Hereinafter, operations performed by region detection device 1B with the above-described configuration will be described with reference to drawings.

Region detection device 1B performs third nail region detection processing that differs in part from the first nail region detection processing according to Embodiment 1.

Figure 21:
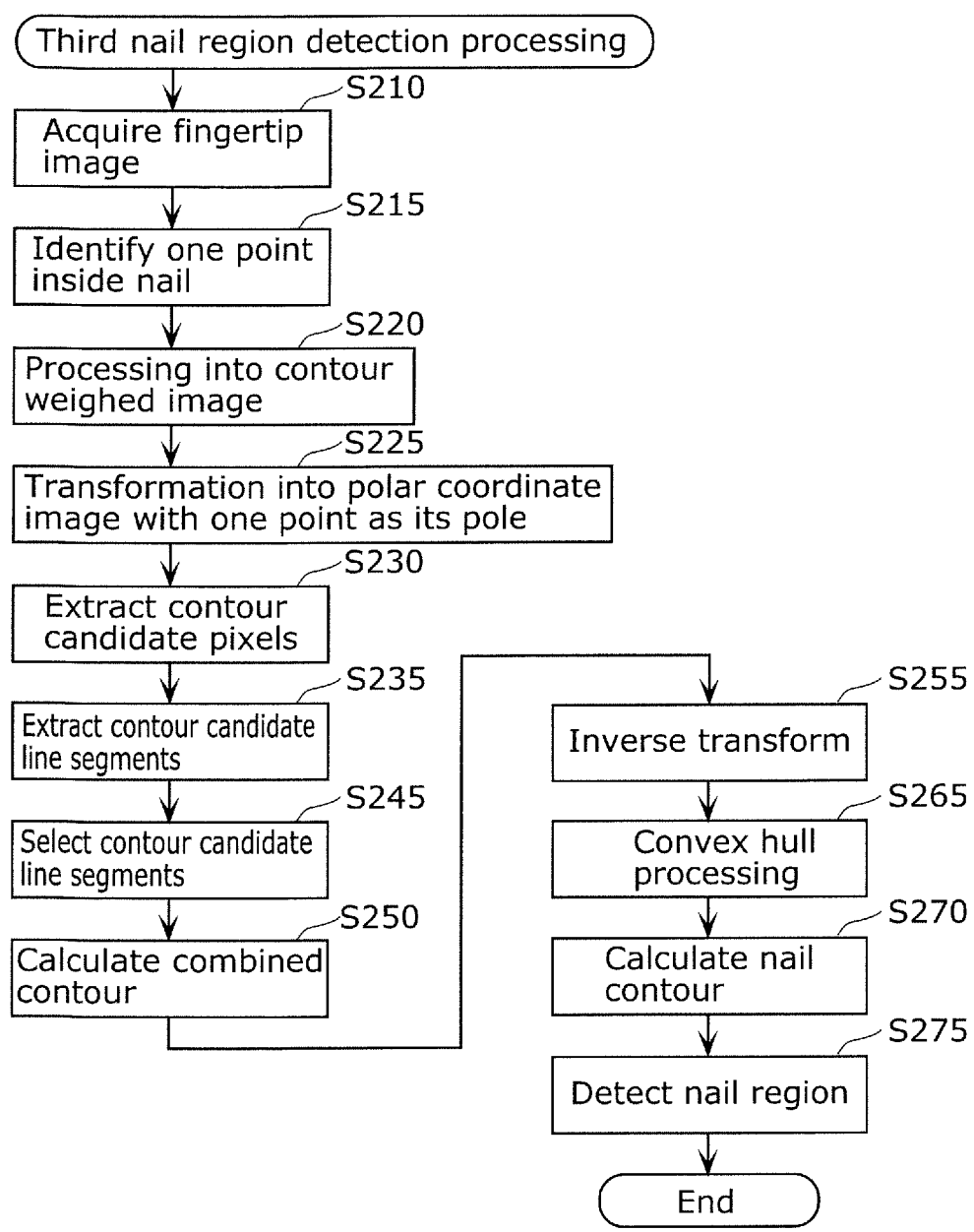
FIG. 21 is a flowchart of third nail region detection processing according to Embodiment 3.

FIG. 21 is a flowchart of the third nail region detection processing.

In the third nail region detection processing, processing from step S210 to step S235 and processing from step S245 to step S275 are respectively similar to the processing from step S10 to step S35 and the processing from step S45 to step S75 in the first nail region detection processing according to Embodiment 1. Thus, hereinafter, the processing from step S210 to step S235 and the processing from step S245 to step S275 are regarded as having already been described, and a detailed description thereof will be omitted. The following description focuses on processing in step S245.

When one or more contour candidate line segments have been selected in the processing in step S235, detector 40 selects, from among the contour candidate line segments to be selected, one or more contour candidate line segments that do not overlap in the direction of the distance in the polar coordinate image so as to select a contour candidate line segment that is most similar to a contour candidate line segment located at the location of line symmetry with respect to the longitudinal center line of the nail in the fingertip image serving as a symmetry axis (step S245).

When the processing in step S245 has ended, region detection device 1B proceeds to processing in step S250. Then, when the processing in step S275 has ended, region detection device 1B ends the third nail region detection processing.

Consideration

As described above, like region detection device 1 according to Embodiment 1, region detection device 1B with the above-described configuration can detect the region of the nail relatively simply and relatively accurately.

Embodiment 4

Hereinafter, a description is given of a region detection device according to Embodiment 4 whose configuration differs in part from the configuration of region detection device 1 according to Embodiment 1.

Configuration

Figure 22:
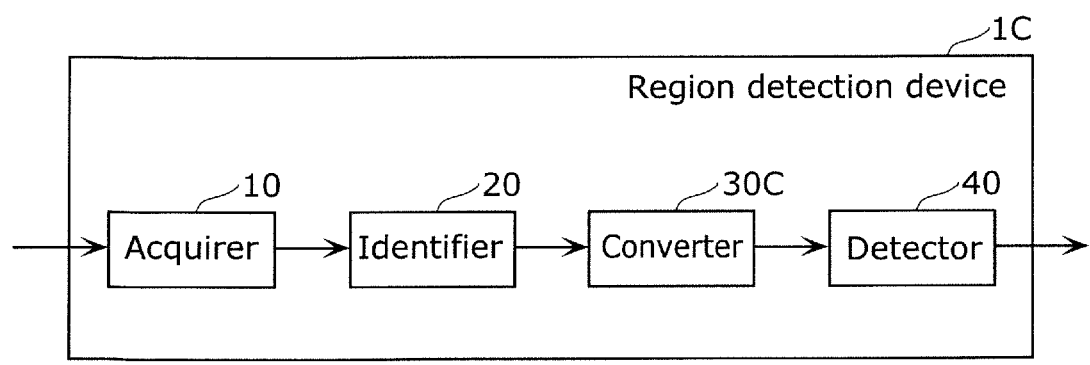
FIG. 22 is a block diagram illustrating a configuration of a region detection device according to Embodiment 4.

FIG. 22 is a block diagram illustrating a configuration of region detection device 1C according to Embodiment 4. Hereinafter, constituent elements of region detection device 1C that are similar to those of region detection device 1 are regarded as having already been described and are given the same reference signs, and a detailed description thereof will be omitted. The following description focuses on differences from region detection device 1.

As illustrated in FIG. 22, region detection device 1C differs from region detection device 1 according to Embodiment 1 in that converter 30 is replaced by converter 30C.

Converter 30C is configured by changing the calculation step of calculating a polar coordinate image from the calculation step performed by converter 30 according to Embodiment 1. More specifically, converter 30C first performs coordinate transformation processing on the fingertip image so as to calculate a fingertip image that has undergone the polar coordinate transform, and then performs contour enhancement processing on the calculated fingertip image that has undergone the polar coordinate transform so as to process the fingertip image into a polar coordinate image.

The above-described configuration allows converter 30C to perform contour enhancement in the contour enhancement processing only in the angular direction in the fingertip image that has undergone the polar coordinate transform.

Operations

Hereinafter, operations performed by region detection device 1C with the above-described configuration will be described with reference to drawings.

Region detection device 1C performs fourth nail region detection processing that differs in part from the first nail region detection processing according to Embodiment 1.

Figure 23:
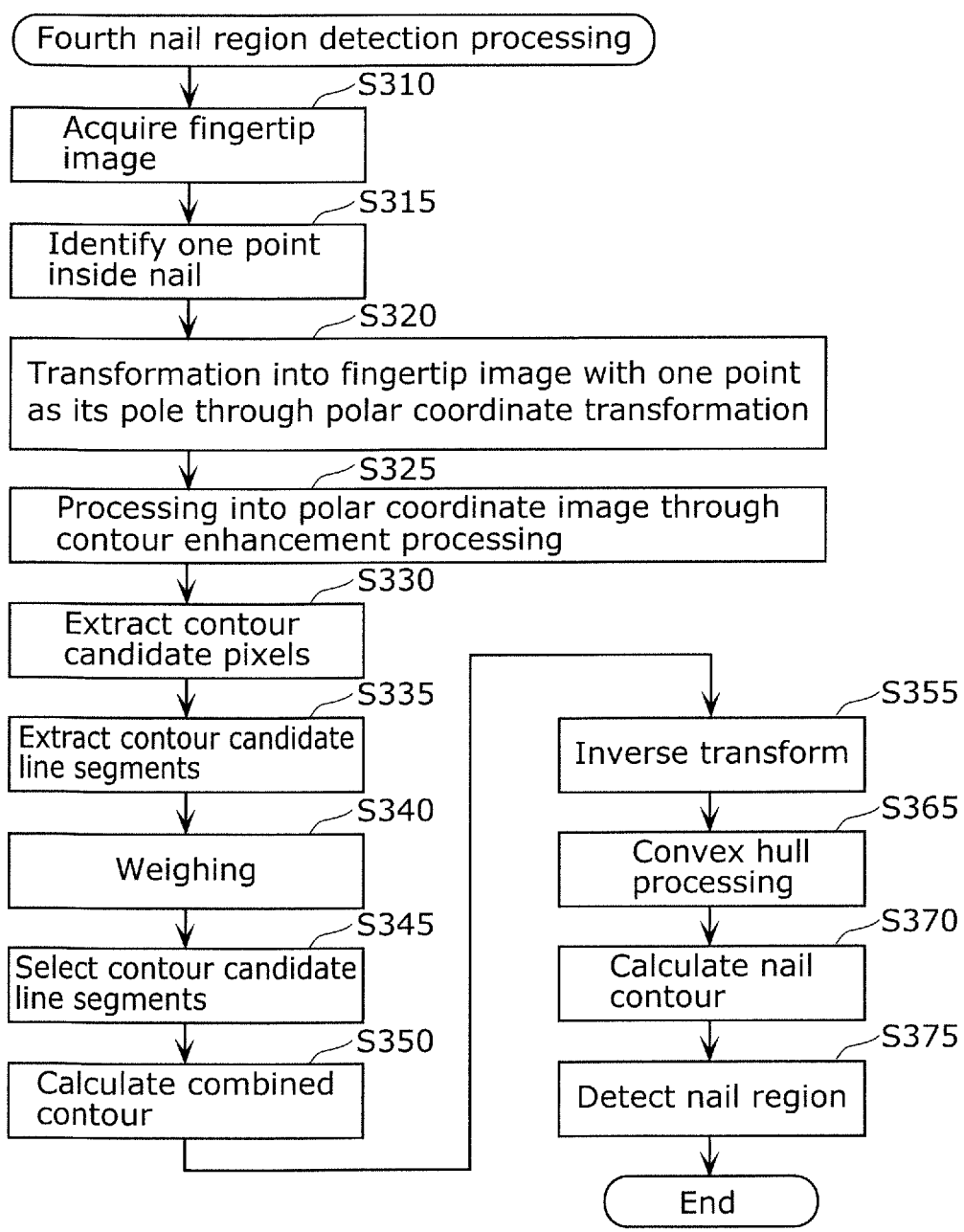
FIG. 23 is a flowchart of fourth nail region detection processing according to Embodiment 4.

FIG. 23 is a flowchart of the fourth nail region detection processing.

In the fourth nail region detection processing, processing from step S310 to step S315 and processing from step S330 to step S375 are respectively similar to the processing from step S10 to step S15 and the processing from step S30 to step S75 in the first nail region detection processing according to Embodiment 1. Thus, the processing from step S310 to step S315 and the processing from step S330 to step S375 are regarded as having already been described, and a detailed description thereof will be omitted. The following description focuses on processing from step S320 to step S325.

When one point inside the nail has been identified in the processing in step S315, converter 30C performs coordinate transformation processing using the identified one point as a pole on the fingertip image so as to calculate a fingertip image that has undergone the polar coordinate transform (step S320).

When having calculated the fingertip image that has undergone the polar coordinate transform, converter 30C performs contour enhancement processing on the fingertip image that has undergone the polar coordinate transform, so as to process the fingertip image into a polar coordinate image (step S330).

When the processing in step S325 has ended, region detection device 1C proceeds to the processing in step S330. Then, when the processing in step S375 has ended, region detection device 1C ends the fourth nail region detection processing.

Consideration

As described above, like region detection device 1 according to Embodiment 1, region detection device 1C with the above-described configuration can detect the region of the nail relatively simply and relatively accurately.

Supplemental Remarks

While the input apparatus according to the present invention has been described thus far with reference to Embodiments 1 to 4, the present invention is not intended to be limited to these embodiments and variations. The present invention may also include forms obtained by applying various modifications conceivable by those skilled in the art to the embodiments, and forms achieved by any combination of constituent elements and functions of different embodiments without departing from the scope of the present invention.

INDUSTRIAL APPLICABILITY

The present invention is widely applicable to devices for detecting a region.

REFERENCE SIGNS LIST 1, 1A, 1B, 1C region detection device
10, 10A acquirer
20, 20A identifier
30, 30C converter
40, 40B detector
50 image capturing unit
51 image capturing device
52 fingertip placement base

The invention claimed is:

1. A region detection device comprising:
an acquirer that acquires a fingertip image of a fingertip including a nail;
a converter that transforms the fingertip image into a polar coordinate image in which one point inside the nail in the fingertip image is used as a pole; and
a detector that detects a region of the nail using the polar coordinate image,
wherein the detector:
extracts a plurality of contour candidate pixels that are candidates for pixels located at a contour of the nail from among pixels in the polar coordinate image;
extracts one or more contour candidate line segments, each consisting of a group of contour candidate pixels adjacent in a pixel sequence in a direction other than a direction of a distance in the polar coordinate image, from among the plurality of contour candidate pixels; and
detects the region of the nail in accordance with the one or more contour candidate line segments that have been extracted.

2. The region detection device according to claim 1, wherein when a plurality of contour candidate line segments have been extracted in the extraction of the one or more contour candidate line segments, the detector:
selects at least one contour candidate line segments that do not overlap in the direction of the distance in the polar coordinate image from among the plurality of contour candidate line segments that have been extracted; and
detects the region of the nail in accordance with the one or more contour candidate line segments that have been selected.

3. The region detection device according to claim 2, wherein in a case where the plurality of contour candidate line segments that have been extracted include a plurality of contour candidate line segments targeted for an alternative selection in the selection of the at least one contour candidate line segments, the detector makes the alternative selection by performing weighing on each of the plurality of contour candidate line segments targeted for the alternative selection so that a longer contour candidate line segment is higher weighed.

4. The region detection device according to claim 2, wherein in a case where the plurality of contour candidate line segments that have been extracted include a plurality of contour candidate line segments targeted for an alternative selection in the selection of the at least one contour candidate line segments, the detector makes the alternative selection by performing weighing on each of the plurality of contour candidate line segments targeted for the alternative selection so that a contour candidate line segment that has a shorter distance from the pole is higher weighed.

5. The region detection device according to claim 2, wherein in a case where a plurality of contour candidate line segments have been selected in the selection of the at least one contour candidate line segments, the detector:
combines the plurality of contour candidate line segments that have been selected, to calculate a combined contour line segment; and
detects the region of the nail in accordance with the combined contour line segment that has been calculated.

6. The region detection device according to claim 5, wherein the detector:
performs inverse transform of the transform on the combined contour line segment; and
extracts the region of the nail in accordance with the combined contour line segment that has undergone the inverse transform.

7. The region detection device according to claim 6, in a case where the combined contour line segment that has undergone the inverse transform has a recess, the detector:
performs convex hull processing on the combined contour line segment to calculate the contour of the nail; and
detects the region of the nail in accordance with the contour of the nail that has been calculated.

8. The region detection device according to claim 1, further comprising:
an identifier that identifies the one point from the fingertip image.

9. The region detection device according to claim 8, wherein the identifier:
extracts a contour of the fingertip from the fingertip image;
calculates a rectangle circumscribing the contour of the fingertip that has been extracted; and
identifies a center of the rectangle that has been calculated, as the one point.

10. The region detection device according to claim 1, further comprising:
an image capturing unit that captures an image,
wherein the acquirer acquires the image captured by the image capturing unit as the fingertip image.

* * * * *